United States Patent [19]
Monsen

[11] Patent Number: 4,581,767
[45] Date of Patent: Apr. 8, 1986

[54] MEASUREMENT OF JAMMING EFFECTIVENESS BY CROSS CORRELATION TECHNIQUES (C)

[75] Inventor: Arthur M. Monsen, East Windsor, N.J.

[73] Assignee: The United States of America as represented by the Secretary of the Army, Washington, D.C.

[21] Appl. No.: 166,265

[22] Filed: Jun. 25, 1980

[51] Int. Cl.[4] .......... H04B 17/00

[52] U.S. Cl. .......... 455/67; 455/1; 455/26; 455/226; 324/57 N; 324/77 G; 343/18 E

[58] Field of Search .......... 343/18 E; 455/1, 67, 455/226, 26; 375/96; 324/77 G, 57 N

[56] References Cited

U.S. PATENT DOCUMENTS 4,194,205 3/1980 Willmore et al. .......... 343/18 E

*Primary Examiner*—Salvatore Cangialosi
*Attorney, Agent, or Firm*—Anthony T. Lane; Sheldon Kanars; Jeremiah G. Murray

[57] ABSTRACT

A method and apparatus is disclosed for automatically and repeatably measuring the effectiveness of jamming applied against a communications link. The method is machine performed, free of the need of listener personnel, and the recording and scoring tasks required in conventional methods. Using a ratio of auto and cross-correlation functions, a number is produced (CCI Index) which is the desired measure of jamming effectiveness. The CCI Index is a standardized value which indicates jamming effectiveness in any type communications link regardless of equipment or type of modulation in use. The Index, rapidly obtainable, can be used to pinpoint which jamming technique might be most advantageously employed, and by precisely how many db it would be superior.

5 Claims, 10 Drawing Figures

CHIP CIRCUIT-CCI MEASURING APPARATUS

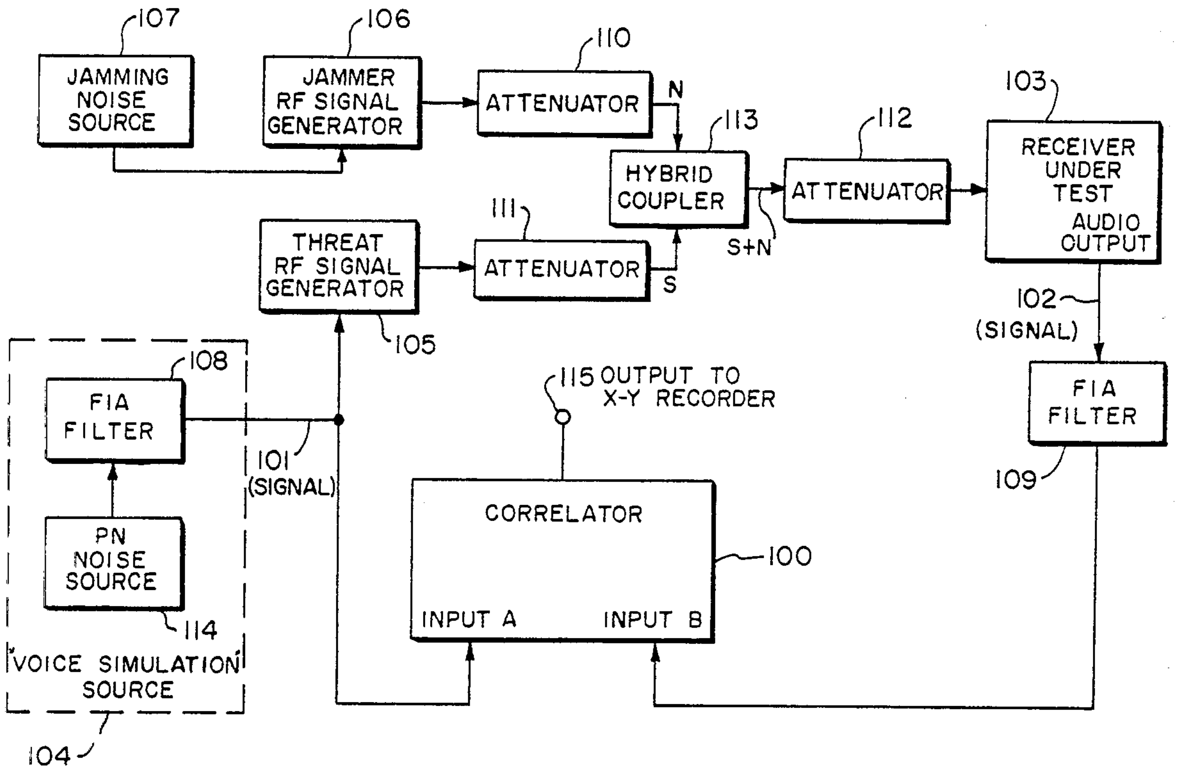
F I G. 1 A CROSS-CORRELATION MEASUREMENT APPARATUS.
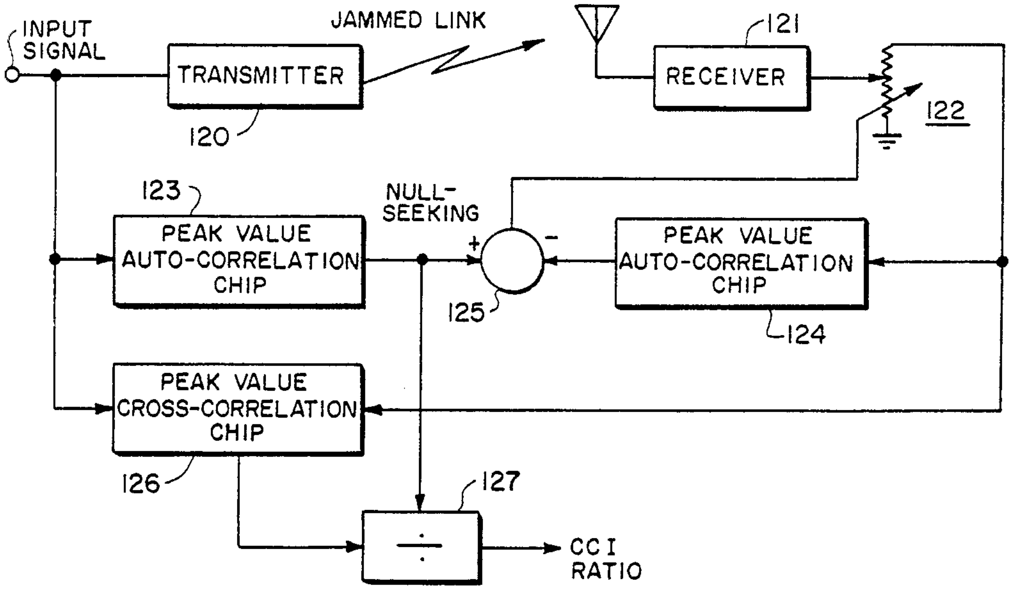
F I G. 1 B CHIP CIRCUIT-CCI MEASURING APPARATUS

JAMMING EFFECTIVENESS FOR CONTINUOUS JAMMING SIGNALS TESTED

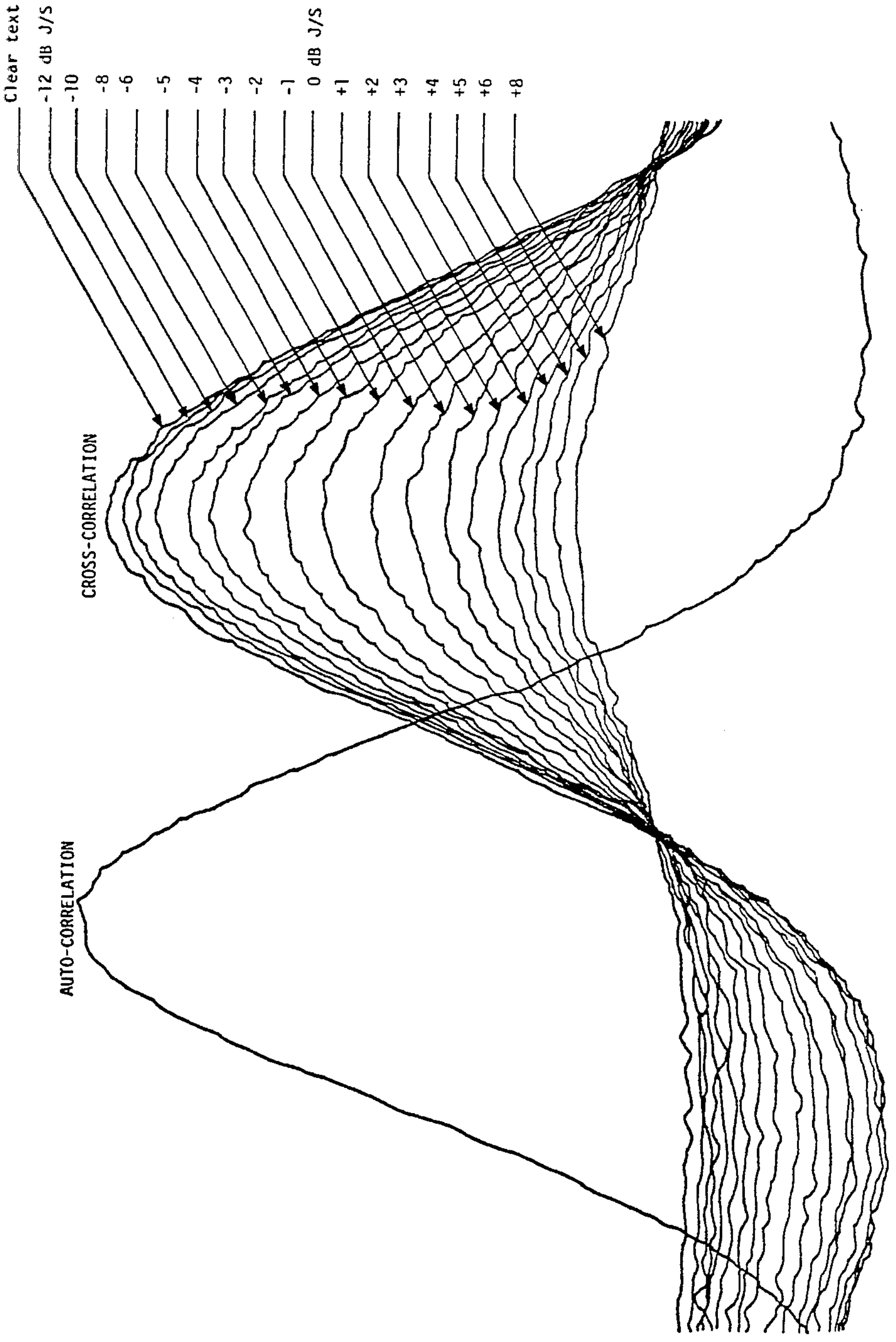
FIG. 2 AUTO- & CROSS-CORRELATION PLOTS.

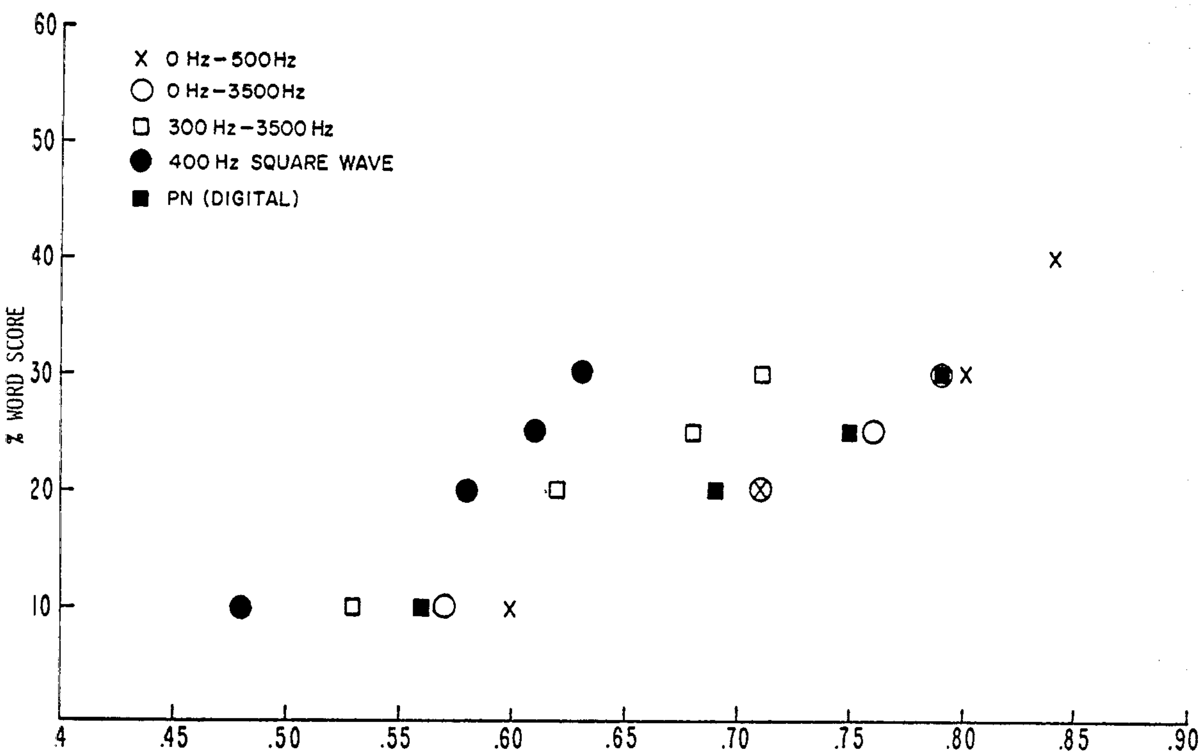
*FIG. 4* MRT WORD SCORE Vs. CCI
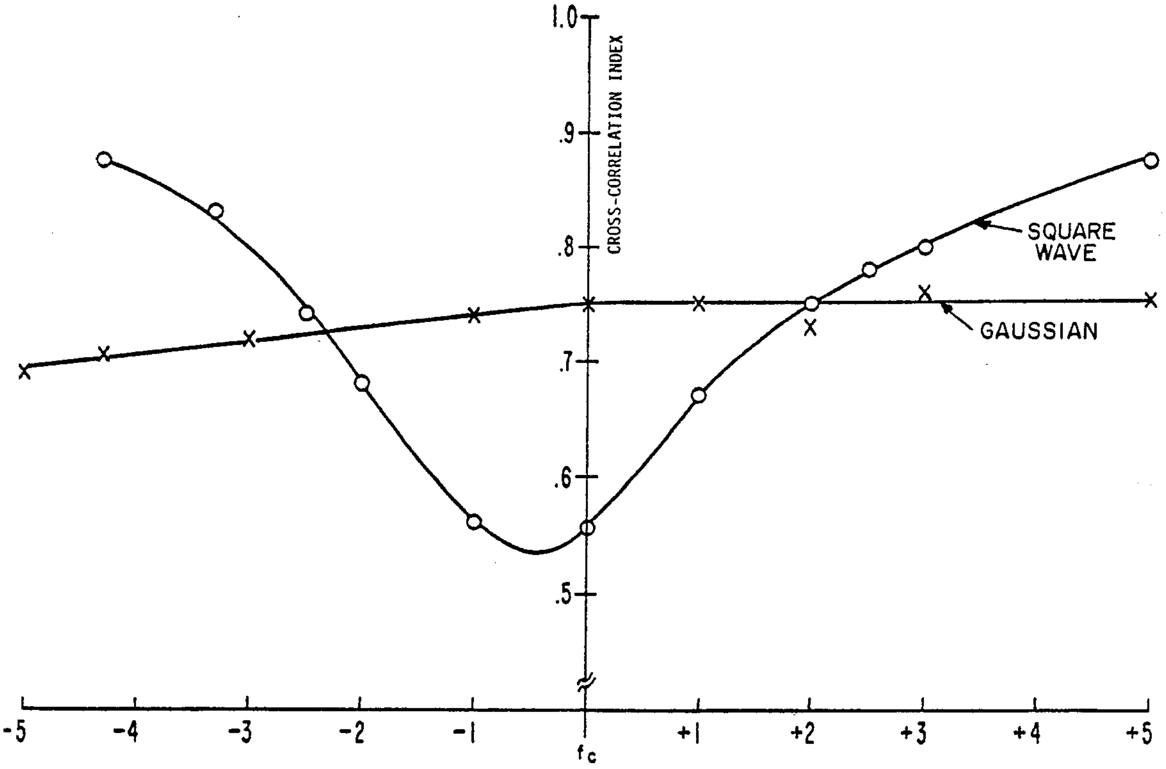
*FIG. 6* JAMMER FREQUENCY OFFSET FROM TARGET SIGNAL(kHz)

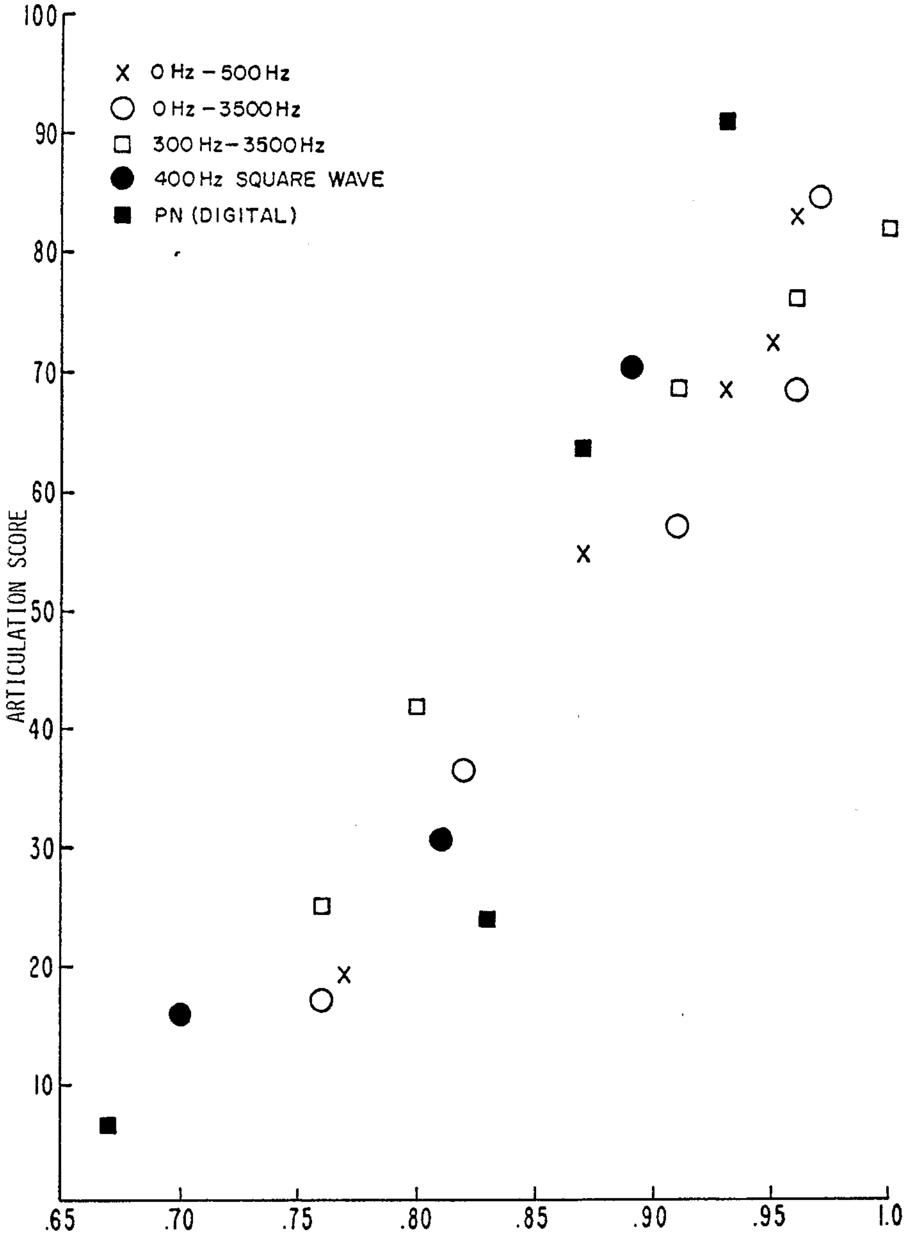
*FIG. 5* PBWL & CCI SCORES, FILTERED LINK.

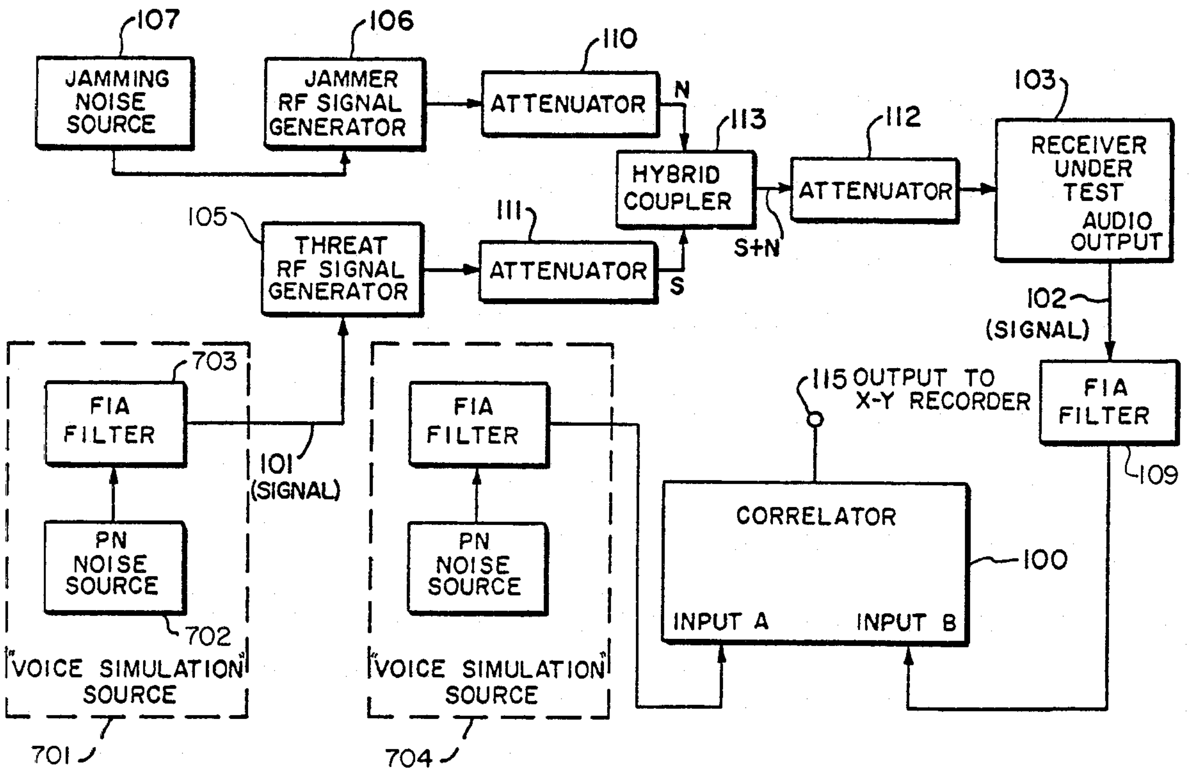
FIG. 7 CROSS-CORRELATION MEASUREMENT APPARATUS.
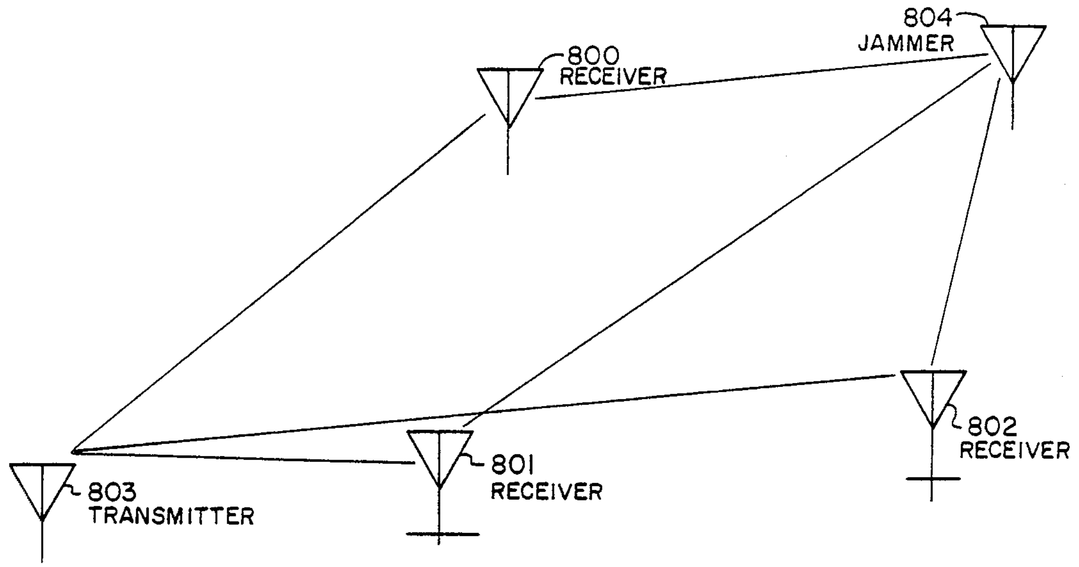
FIG. 8

MEASUREMENT OF JAMMING EFFECTIVENESS BY CROSS CORRELATION TECHNIQUES (C)

The invention described herein may be manufactured and used by or for the Government for governmental purposes without the payment of any royalties thereon or therefor.

BACKGROUND OF THE INVENTION

This invention relates to the field of electronic communications counter measures, and more particularly to the field of measurement of the effectiveness of jamming upon any given communications link. The methods conventionally used to provide a measure of jamming effectiveness such as the various scoring methods, suffer from a lack of standardization, accuracy, and need for large amount of personnel, cost and time. The lack of standardization in the existing scoring technique is coumpounded by the factors of often using different test messages, different listeners and of having different scoring methods. Types of jamming modulation systems sought to be effectively compared but for which an adequate comparison means was not available by the conventional scoring techniques were: FM by noise, AM by noise, pseudorandom (PN) binary noise, or tone bagpipes. Different test messages used as scoring techniques included the Modified Rhyme Test Message (MRT), the Phonetically Balanced Word List (PBWL), numbers, news broadcasts, and military phrases. The scoring methods were based on either the number of correct listener identified words or on the time required to acknowledge a correct message. These factors affected the determination of the figure of merit for jamming, i.e., the jamming-to-signal (J/S) ratio, which is needed to compare different jamming effectiveness. A standard is needed to facilitate comparison of jamming for systems of different form and structure. Word score tests run on an FM transceiver with different word messages illustrate the difficulties encountered in comparison; and an indication of the imprecise results obtained in any case.

While the J/S ratio, type of jamming modulation, and transceiver link were identical in two instances, a word score was obtained of 20% for a MRT message, but 50% for a PBWL message. While each percentage score may well be indicative of the J/S ratio of the jamming being applied against the link, it is noteworthy that the scores are not capable of ready comparison with each other. Still different results occur with other messages, such as number sequences, or news broadcasts. Consistent scores from a test panel, with any of these techniques requires, additionally, selection of proper listeners, facilities, and a training period. Scoring techniques through mechanizable on a limited basis, nonetheless require costly personnel or equipment. A description is given of the complex scoring method by a trained listener panel using the PWBL, being a conventional approach: A listener test facility consists of eight booths with CRT screens mounted in front of each listener. Fifty words are displayed on the screen and there is a button below each word. Half the words on the screen are correct and the other half are not. The listener is supposed to push the button under the word that he thought he or she heard. A monitor sits in the room and a display in front of him indicates how many correct words each listener has identified. In this way a seasoned group of listeners may be selected who have a good record of accurately identifying a message. Using the same group, a percentage of accurate receipt of a preselected message transmitted through the link, is formed, which is indicative of the jamming to signal ratio in the link. A listener panel with proper facilities and training is required to obtain consistent scores with test messages. The need for assembling such a panel could delay scoring by days or weeks. An alternate approach is mechanized scoring, but present automatic scoring machines are not only costly, but limited in scope. The replacement of these incompatible, laborious and undependable conventional techniques with a rapid, standardized machine-implemented method is therefore readily appreciated.

BRIEF DESCRIPTION OF THE INVENTION

The method and apparatus of this invention provides a voice simulation input signal to a receiver or communication network under test. The output of the receiver, representing the signal which has passed through the network under test, is crosscorrelated with the (audio) input, while an autocorrelation is produced for the input signal alone. The produced functions are compared in forming a CCI (cross-correlation index). In the system described, a pseudonoise source is audio filtered to form a simulated voice source then used to drive an rf generator. A high frequency jamming source is produced and combined with the signal in a hybrid coupler. By adjusting attenuation devices a Jam-To-Signal ratio may be set, and the combined signal may be fed to the link or receiver under evaluation. A correlation formulating network is used in cross-correlating the output from the receiver with the audio input, and autocorrelating the input. The derivation of the CCI index, to be described in greater detail later on, involves a ratio of these two functions. It is important to note that the CCI index, once formed, is a direct indication of the jamming effectiveness for the particular link under study. There is absent the need, in evaluating a percentage score in the word tests, of knowing how the tests were conducted. Further, there is never any difficulty in comparing tests results over different runs, the values are standardized. The setting of the correlator input levels, to be described in greater detail later on, and taking of a measurement, requires in all, less than a minute, for each condition desired. The technique may be used regardless of the structure of the system under test or the waveform shape or frequency of input or jamming signals.

OBJECTS

Accordingly, one object of this invention is deployment of a standardized method for comparing jamming effectiveness applied against various communication links, irrespective of the type of link involved.

Another object is a method of measuring jamming effectiveness which is fully automatic, eliminating need for large numbers of listening personnel, and machine conducted in a fully repeatable fashion.

A still further objective is provision of a rapid machine method of measuring jamming effectiveness, applied against a communications link, implemented in as litle as a half minute's time.

Another object is provision of an apparatus for calculating jamming effectiveness not requiring handling by personnel for hand scoring or costly mechanized counting for interpreting the data, and wherein:

BRIEF DESCRIPTION OF FIGURES

FIG. 1A illustrates apparatus used for obtaining a cross correlation index according to this invention;

FIG. 1B illustrates an alternate, chip circuit embodiment for the apparatus shown in FIG. 1A;

FIG. 2 shows typical plots of auto-correlation and cross-correlation functions relative to a particular communications link, used in obtaining a CCI;

FIG. 4 is a plot of the CCI index and MRT word score obtained for the same link as in FIG. 3, with variation of various input waveforms;

FIG. 5 is a plot of the CCI index and PBWL articulation score obtained for the same link with addition of audio filter elements, and with variation of various input waveforms;

FIG. 6, used to study optimum jamming frequency offset from that of a target's, is a plot of the CCI index as affected by jammer frequency being varied from target signal frequency;

FIG. 7 illustrates a field deployable embodiment of the apparatus of this invention, showing duplicate noise sources, as signal input and at the field correlator location; and FIG. 8 illustrates an application of the equipment of this invention for determining selection of the most effective jammer for use against a hypothetical enemy array of receivers positioned as shown.

Figure 1C:
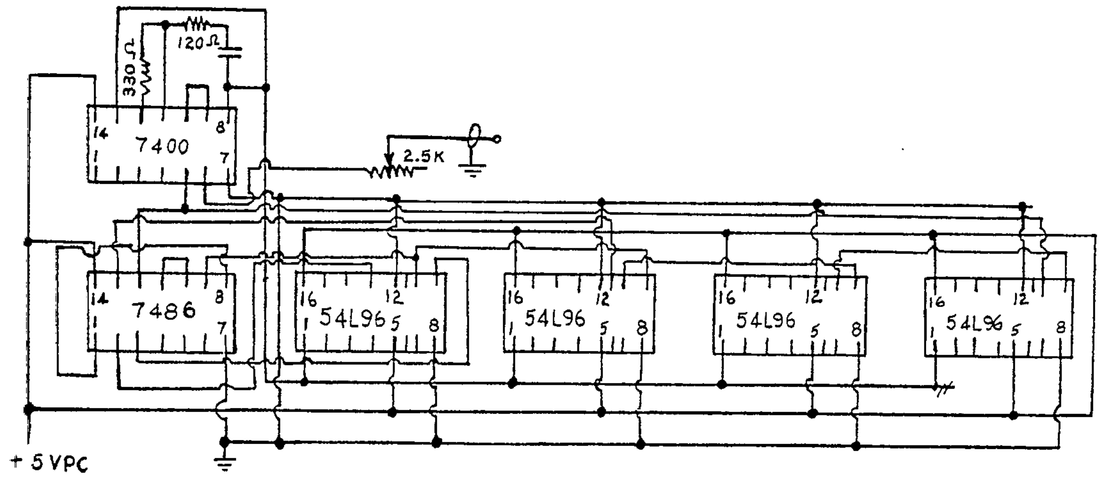
FIG. 1C is a circuit diagram of the pseudo-noise generator used in this system.

The foregoing and other objects and advantages of the invention will appear from the following description. In the description reference is made to the accompanying drawings which form a part thereof, and in which there is shown by way of illustration and not of limitation a preferred embodiment. Such description does not represent the full extent of the invention, but rather the invention may be employed in different arrangements as will be recognized by those skilled in the art, within the spirit of the claims herein.

DETAILED DESCRIPTION OF FIGURES

In FIG. 1, apparatus for determining jamming effectiveness against a communications link according to this invention is shown. A hypothetical communications device, radio receiver 103, is shown mounted within this system, which receiver is to be studied for its jamming effectiveness to a simulated voice source. Using only two measurements, auto-correlation of the voice-simulation signal (input to link) and cross-correlation of the receiver audio output signal with respect to the voice-simulation signal, a cross-correlation index (CCI) may be derived, which value is a repeatable, numerical measure of effective jamming present.

As shown in FIG. 1A, a correlator 100 is used to make cross-correlations between the signal used to modulate an R.F. generator 101 and the audio signal 102 coming out of a radio receiver 103 being tested for its jamming characteristics. Commercially available correlators or circuits of similar designs may be used for element 100. The cross-correlation ratio of no jammed signal to jammed signal gives a means of determining intelligibility of a message. A signal source 104 is used to modulate an R.F. generator 105. In the above example the signal source comprises an PN sequence generator 114 with an F1A filter network 108. The modulated R.F. signal passes to the receiver, and the audio output of the receiver 102 passes to the correlator. Input A of the correlator is the original signal 101 directly from the signal source. The input to channel B of the correlator is the audio output of the receiver after its passage through an FIA filter.

The two signals going into the correlator must have the same RMS value in order to provide meaningful results. A means of setting the RMS values equal is by using the auto-correlation function, since the peak value displayed when taking the auto-correlation is the RMS value. As a first step, the auto-correlations of the signals at both A and B, done separately, are obtained.

These are indicative of the RMS values of these signals. Next, the RMS values of each signal are set at equal levels by adjusting attenuators on the correlator's network for A and B inputs. Once the levels are set, the cross-correlation of A and B can be taken. The cross-correlation is taken with respect to the A input, being the input signal to the system, not affected by any of the components of the system. By taking the cross-correlation it is possible to represent how much of the original signal is passed through the system. The cross-correlation measurements taken using different ratios of jamming therefore, should be proportionate to jamming ratio, being a measure of information content sent through the system. The CCI index, it is to be noted, is a direct measure of jamming that was present in the system.

The block 104 may be visualized as simulating a microphone in practice, while the transmission link in practice is simulated by connections between the transmitter at 105 and the receiver 103, with addition of noise, simulated by coupling a noise signal at 113, received from 106. The J/S ratio is simulated by setting the ratio of the attenuators 110 and 111 while attenuator 112 adjusts the total power allowed to pass into the receiver. The typical human voice is simulated in 104, for example, by generating a pseudo random (noise) signal (digital) at 114. A PN source was chosen because it has high correlation ability, and it was designed to have a sequence length of $2^{20}$-1 bits and a clock frequency of 7.5 kHz. This combination gives a uniform spread of frequency components across the audio band. In order to simulate the frequency distribution of speech, the PN source is filtered by a conventional F1A audio weighting network. (The F1A is used by the telephone industry for noise measurements.) After passage through the F1A filter, the noise becomes analog, and frequencies are in the vicinity of 10 kHz, the audio range. In addition, the F1A filter 108 cuts out the lowest frequencies making it all the more realistic, since the human ear would not discern those low frequencies. The filter at 109 was added for the same purpose, in simulating low frequency rejection by the human ear. That is, in accordance with the Fletcher-Munson curves, at low volumes, the human ear cannot discern low frequency sounds. The jamming signal added in at coupler 113, may be either analog or digital, its function is only for the introduction of noise. The RF output of the signal generator 105 (threat transmitter) is in the megahertz range and the output at 106 might be comparable. The jammer noise source 107 used to modulate 105 might be any random generator.

In accordance with the method mentioned earlier, so determine a CCI, the operator sets the desired J/S condition and measures the auto-correlation of channel A (voice-simulation signal) and then the auto-correlation of channel B (receiver audio output). To eliminate signal amplitude as a variable, the operator adjusts the audio output signal on 103 so that the maximum auto-correlation of channel B equals the maximum auto-correlation of channel A, thus assuring equal RMS values of the signals. This might also be done, as mentioned earlier, by adjusting attenuators on correlator 100, if available. Next the cross-correlation of channel B is taken with respect to channel A, and the auto-correlation and cross-correlation are plotted on an X-Y recorder at 115. These plots, illustrated typically in FIG. 2, are used to determine the CCI, using a ratio of the peak amplitude of the cross-correlation curve to the peak amplitude of the auto-correlation curve of the input signal plotted on the same scale with respect to relative amplitude, and this ratio is a satisfactory jamming effectiveness measure. The source shown in FIG. 1A is a pseudonoise source, for which an exemplary signal generating source is shown in FIG. 1C. However, the CCI measurement is also successfully taken using Gaussian noise, other PN, and square-wave type modulation sources in place of the source in 114, for example. FIG. 1B illustrates an alternate embodiment in semiconductor circuit form for constructing the apparatus of this invention. In it, the auto-correlation of the input and output of a communications link under study are measured at 123 and 124 and compared at 125. The output of the receiver is automatically adjusted at 122 until the peak values are equal. At 126, a cross-correlation of output to input signals is being taken and the ratio of its peak value to the input auto-correlation is being produced at 127. This provides a readout of the CCI index which is a measure of jamming in the link.

In FIG. 2, an auto-correlation curve of the input signal is shown symmetrically centered and having an amplitude in terms of $(\text{volts})^2$. The amplitude of the cross-correlation curves depends, of course, upon the proportion of jam to signal, since as mentioned before, it is a direct measure of how much of the input signal has been allowed to pass through the system. That is, when jamming is introduced into the link, the cross-correlation peak will be altered; the change in peak amplitude is a direct indication of jamming present. The lowest peak is for complete (maximum) jamming (infinite dB of J/S ratio), while the highest peak, as shown, is for no jamming (clear text). The highest peak cannot be quite as high as the auto-correlation peak, since some losses necessarily occur in transmission in any system no matter how near perfect. The filtering provided in this system would, for example, account for a lower cross-correlation peak. The peaks vary, as shown, according to number of dB of J/S ratio introduced. The desired CCI index is found by dividing the highest peak of cross-correlation by the peak of the auto-correlation function.

Figure 3:
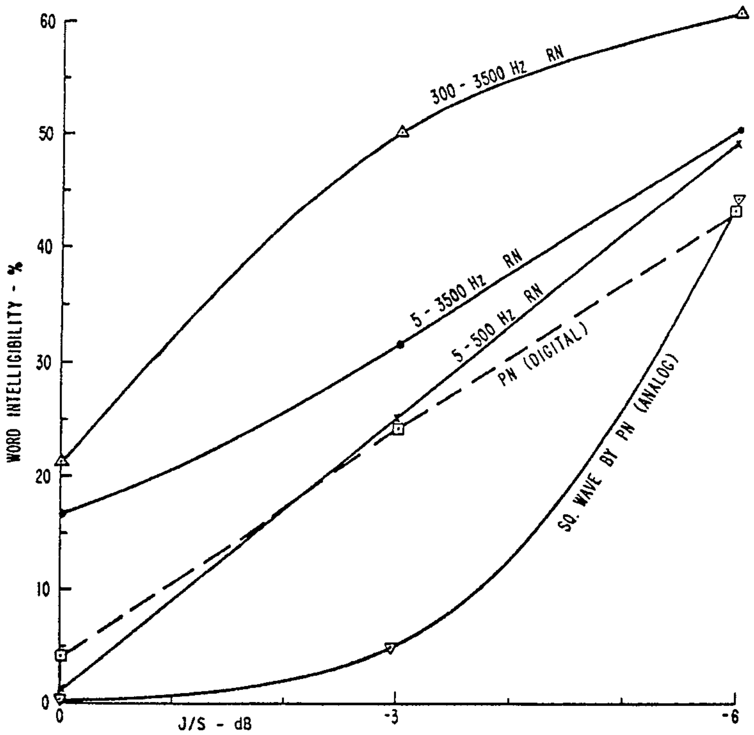
FIG. 3 shows the effect, as determined by conventional MRT scoring methods of jamming effectiveness on a selected communications link, when the jamming signal input is of various waveform types.

In FIG. 3, using a conventional listening test, a modified rhyme MRT, the percentage intelligibility of a prepared message, as a function of Jam-to-Signal ratio, by a seasoned listening panel has been plotted. This study has shown the effect of varying five different types of jamming noise sources at place of elements 106–107, such as band limited gaussian square wave modulated by pseudo-noise analog signal, and so forth. The results of this study have shown that band-limited gaussian modulation produced the most intelligible reception under those conditions. A plot of CCI Index, obtained much more readily, versus J/S ratio of jamming applied, would have yielded the same results. While the curve for 300–3500 HZ is higher than for 5–500 HZ, in reality the two curves should be interchanged, with the lower one labelled 300–3500 HZ, the 5–500 HZ range being higher, indicating it is better for this application. The curve shown was found by listening tests, however, it was inaccurate because the listeners missed certain low frequency sounds because of the human ear's inability to discern them, at lower volumes. No such difficulty occurs with this invention, since to realistically simulate this condition, an FIA audio filter was added at 109. These plots were shown in FIG. 3; the low frequencies, notably, were rejected. It is believed that other filters at 109 might produce even better correlation of CCI and word scores, for example, the Active C-message type weighted filter.

One should appreciate the vast savings in effort using the automatic device of this invention in plotting the data of FIG. 3, for example. In a matter of minutes all the required information may be obtained. In perhaps a half minute per point, the measurements may automatically be taken, and all the points then plotted. By the conventional MRT method, a fifty word list would have to be transmitted to the remote sites, where seasonal listeners would record what they were able to hear. Scoring could thereafter require three weeks if sent out, or a half hour per point of measurement if done in house, and require some eight personnel total. By the automatic method of this invention, twenty measurements can be taken at some seven seconds each, and all twenty points plotted in about one half hour, as in FIG. 6, for example. Required would be only two persons, one jeep driver, e.g., for the fielded correlator and one person at the transmitter station.

In FIG. 4 a plot is shown for percentage intelligibility by the MRT word score method and CCI index for the systems of FIG. 3 (varying type of jamming). As might be expected the tendency of the points is to form a straight line, since both numbers are a measure of percentage jamming present in a system. FIG. 5, the points tend to form a near straight line. The points more nearly tend to a straight line here than in FIG. 4, because of the added filters, making the machine method more nearly a simulation of the listener method where the human ear misses (filters) those low frequencies. The plots are for five different types of jamming sources, where percentage intelligibility based upon a PBWL articulation score was plotted against CCI Index. Again, this is so since both are methods of indicating degree of jamming operative in a given system.

FIG. 6 illustrates the use of CCI for selecting certain jamming parameters in this case for offsetting the jammer frequency in respect to the threat carrier frequency. Curve A is the result of using a band-limited (0 Hz to 3500 Hz), clipped, Gaussian noise. Curve B is the result of using a 400 Hz, square-wave-frequency signal modulated by a PN source. If the jamming carrier frequency is close to the threat carrier frequency the 400-Hz square-wave jamming source is more effective than the band-limited gaussian source. The cross-correlation technique determined that the 400 Hz noise, with no carrier frequency offset, was 3 dB more effective than the Gaussian noise. Curve B shows a rapid decrease of the effectiveness of the 400 Hz jamming, however, as the jammer frequency is offset from the target frequency. Considering the set-on inaccuracy of fielded jammers, it may be concluded from these curves that the band-limited Gaussian noise, for example, is more useful for jamming modulation. This application shows one use of the CCI technique.

The CCI technique is also used to determine optimum FM deviation for a particular noise source; within minutes, the optimum value may be found in practice. For a fixed J/S ratio, an FM deviation was sought that would produce the lowest CCI; a different FM deviation would have produced a CCI greater than the optimum. The optimum FM deviation was found. Should other parameters be varied, the CCI will indicate immediately whether the jammer effectiveness is varied. The usefulness of CCI in pinpointing design parameters should therefore be apparent. Tests have demonstrated that derivation of the CCI is readily repeatable with great consistency and accuracy. In one case where clipped, band-limited Gaussian noise was used, a CCI index measured over a period of months was always within a 2 percent range of its median indication.

When the method is adapted for field use, as in FIG. 7, two or more identical pseudorandom noise generators and identical filter units are used, 701 and 704, and a CCI found with one PN generator 702, and filter 703 of the transmitter and the other PN generators, filters and correlators at the remote receiver or receivers. Using the two or more identical PN generators gives the same CCI as when using only one PN generator as in the laboratory where a lead may also be run to the correlator input A. In the field, the distance makes this connection unfeasible. The synchronization of the two PN generators is, of course, essential. Arrangements are made so that they simultaneously generate identical pseudo-random codes, using well known techniques. One way to assure synchronization is to utilize the received pseudorandom message at input "B" of the correlator, another method would be to transmit a synchronizing signal in the existing, or in an added communications link.

Using separate but identical PN generators along with a correlator at the receiver sites can enable interesting field jamming studies. One example is the placement of PN generators, filters and correlators with a number of receivers at a number of different locations to determine a jammer's effectiveness. An arrangement such as this is shown in FIG. 8. A number of receivers 800, 801, 802 are placed at various locations while using one jammer 804 and one threat transmitter 803. A clear channel CCI can be obtained at each radio simultaneously when no jamming is present. Then the CCI can be obtained with the jammer on. Comparison of the CCI ratios will give range and terrain effectiveness with one simultaneous measurement. That is, the effectiveness of using that jammer device against the particular receiver equipment in the field may be readily ascertained. Changes over distance, terrain, type of receivers, weather or any other factors can be determined at once, at each correlator. It is no longer necessary to transmit coded messages for studying human reception of the messages at these locations, eliminating need of scoring these results, both costly and time consuming, as well as less accurate than the machine method.

The CCI measure can therefore be used as an aid in choosing a jammer which is suitable for the given application as well as studying vulnerability of a communications network to enemy jamming.

What is claimed is:

1. Apparatus for automatically measuring the degree of jamming effectively being applied against any particular communications link including transmitter and receiver portions therein, comprising;

first circuit means for measuring a first peak value autocorrelation of a first signal being transmitted within the link;

second circuit means for measuring a second peak value auto-correlation of the detected, receiver signal;

third circuit means for attenuating the power level of the receiver's output so that said first and second peak values are equal;

fourth circuit means for measuring a third peak value cross-correlation of the attenuated receiver signal with the said first transmitted signal;

fifth means for forming a ratio of the said third peak value and first peak value;

whereby the said determined ratio is a measure of the jamming effectiveness, measuring the degree of jamming present in the communications link.

2. The apparatus of claim 1 wherein the link is an FM voice communications link.

3. The apparatus of claim 1 wherein the said first, second and fourth circuit means comprise small, lightweight, correlator chips.

4. The apparatus of claim 1 wherein the said first, second and fourth circuit means are comprised within a single portable correlator unit.

5. A method of automatically measuring the degree of jamming effectively being applied against a particular communications link having transmitter and receiver portions, comprising the steps of:

measuring a first peak value autocorrelation of a first signal being transmitted within the link;

measuring a second peak value autocorrelation of the detected, receiver signal;

attenuating the power level of the receiver's output so that said first and second peak values are equal;

measuring a third peak value crosscorrelation of the attenuated receiver signal with the said first transmitted signal;

forming a ratio of the said third peak value and first peak value;

whereby the determined ratio is a measure of the jamming effectiveness, measuring the degree of jamming present in the communications link.

* * * * *

UNITED STATES PATENT AND TRADEMARK OFFICE

CERTIFICATE OF CORRECTION

PATENT NO. : 4,581,767

DATED : April 8, 1986

INVENTOR(S) : ARTHUR M. MONSEN

It is certified that error appears in the above-identified patent and that said Letters Patent are hereby corrected as shown below:

On the cover page:

Item [54], In the Title:

After "TECHNIQUES", delete -(C)-

Column 1, In the Title:

After "TECHNIQUES", delete -(C)-

Signed and Sealed this

Seventeenth Day of November, 1987

*Attest:*

DONALD J. QUIGG

*Attesting Officer*

*Commissioner of Patents and Trademarks*